United States Patent [19]

Wilamowski

[11] 3,805,397
[45] Apr. 23, 1974

[54] GEOMETRICAL MEASUREMENT DEVICES
[76] Inventor: George Wilamowski, 4818 W. Wegg, East Chicago, Ind. 46312
[22] Filed: June 30, 1971
[21] Appl. No.: 158,193

Related U.S. Application Data
[63] Continuation-in-part of Ser. No. 12,286, Feb. 18, 1970, abandoned, which is a continuation-in-part of Ser. No. 789,128, Jan. 6, 1969, Pat. No. 3,562,773.

[52] U.S. Cl. .................................. 33/114, 33/191
[51] Int. Cl. .............................................. B43l 7/00
[58] Field of Search ............ 33/191, 114, 107, 137, 33/138, 158, 97, 98, 103, DIG. 9, 95, 173

[56] References Cited
UNITED STATES PATENTS

| | | | |
|---|---|---|---|
| 1,691,279 | 11/1928 | Gates | 33/97 |
| 2,591,333 | 4/1952 | Bellmer | 33/173 X |
| 3,158,941 | 12/1964 | Komstadius | 33/158 X |
| 2,300,401 | 1/1942 | Basler et al. | 33/DIG. 9 X |
| 3,025,609 | 3/1962 | Hendrix | 33/191 |
| 3,242,578 | 3/1966 | Moll | 33/88 |
| 3,345,755 | 10/1967 | Ferebee | 33/191 |
| 3,427,721 | 2/1969 | Moll | 33/138 X |
| 1,187,658 | 6/1916 | Sauerhering | 33/191 |
| 2,599,819 | 6/1952 | Fisher | 33/191 |
| 3,095,651 | 7/1963 | Luedicke | 33/138 X |
| 365,938 | 7/1887 | Phillips | 33/191 |

Primary Examiner—Louis R. Prince
Assistant Examiner—Charles E. Phillips
Attorney, Agent, or Firm—Hill, Sherman, Meroni, Gross & Simpson

[57] ABSTRACT

Geometrical measurement devices are provided for use by machinists in locating a cylinder axis of an arcuate edge formed on a workpiece. An embodiment comprises two graduated scale bars joined in adjustable 90° relationship by clamping means so that the intersection of longitudinal axes of the bars may be positioned at equal radial distances from two points on the arcuate edge, thereby positioning the intersection at the cylinder axis. In order conveniently to scribe or measure radial distances from the thus located axis, the clamping means may include means supporting a trammel block, forming a portion of a beam-trammel instrument, for pivotal movement about the axis. In another embodiment the beam-trammel instrument, by utilizing a part of the first embodiment is adapted for obtaining difficult inside diameter of a bore where an inside caliper cannot be used.

5 Claims, 12 Drawing Figures

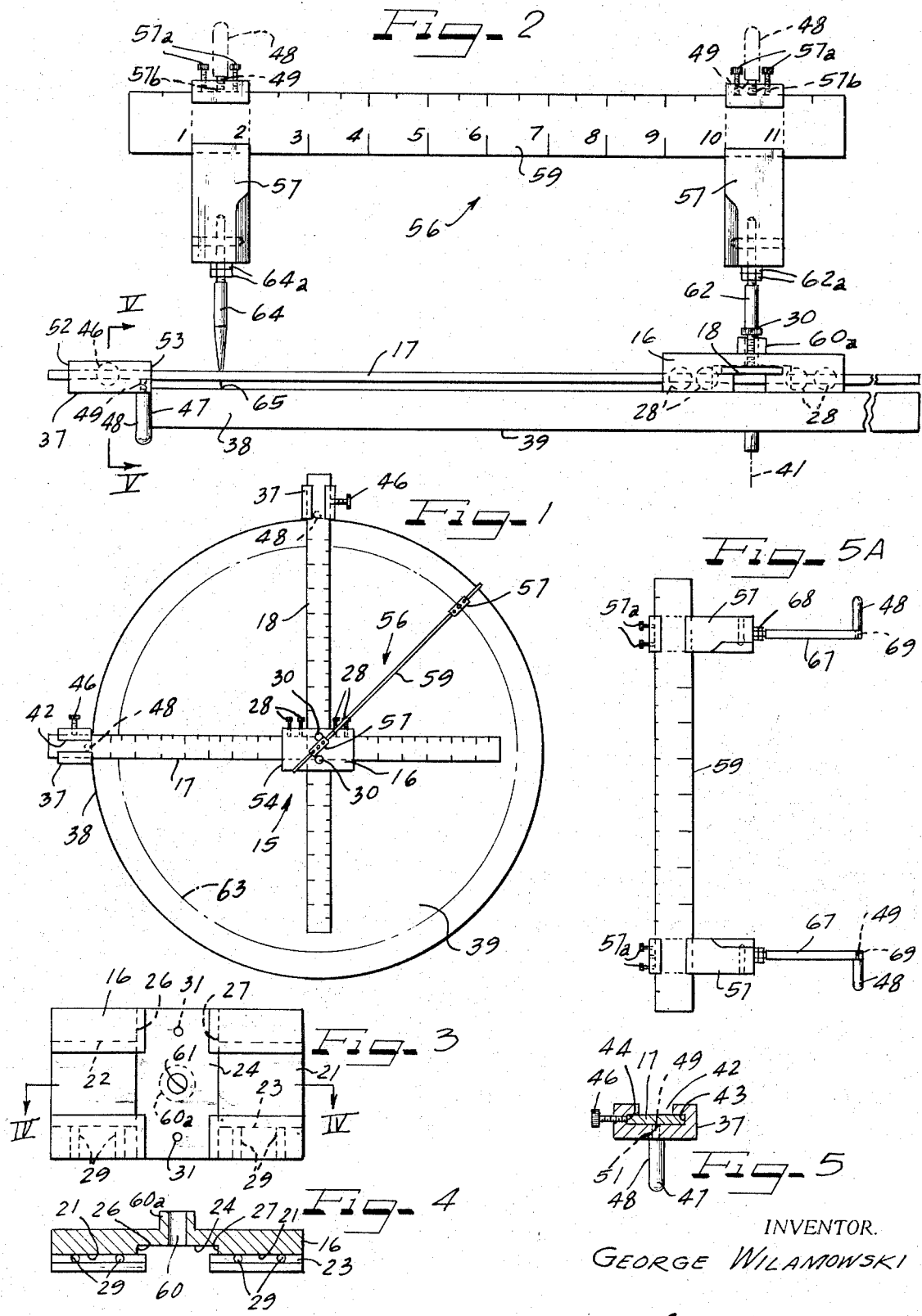

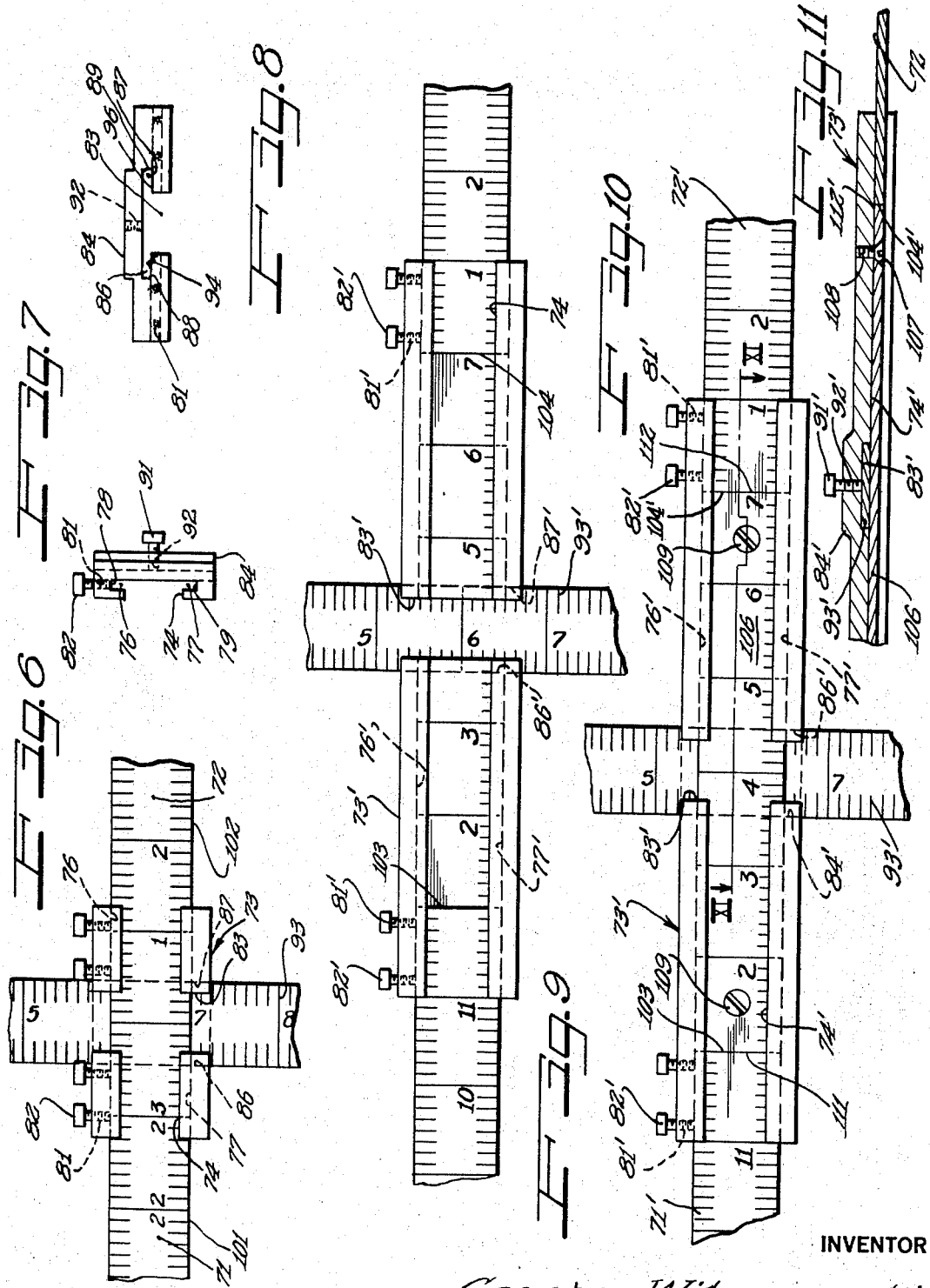

GEOMETRICAL MEASUREMENT DEVICES

CROSS REFERENCE TO RELATED APPLICATIONS

This application is a continuation-in-part of my co-pending application Ser. No. 12,286, filed Feb. 18, 1970, now abandoned, which was a continuation-in-part of application co-pending therewith, Ser. No. 789,128, filed Jan. 6, 1969, now U.S. Pat. No. 3,562,773.

BACKGROUND OF THE INVENTION

1. Field of the Invention

This invention relates generally to geometrical measurement devices, and is more particularly concerned with such devices especially useful by machinists in locating a cylinder axis of an arcuate edge of a workpiece, and for determining other measurements.

2. Brief Description of the Prior Art

A machinist is oftentimes required to locate a cylinder axis of an arcuate edge surface or arcuate line on a workpiece for the purpose of measuring and locating points disposed a certain radial distance from the located axis. A simple and inexpensive instrument enabling a machinist to conveniently locate the cylinder axis of the arcuate portion could greatly reduce the time necessary for several machine operations.

A particular problem exists with respect to annular workpieces, or workpieces that may have been roughed out into approxmate circularity but require that a perfectly circular dimension be provided thereon, since those types of workpieces have either no central portion on which a mark may be placed to indicate the location of the axis or may lack a perfectly circular edge to serve as a guide. Prior art of which I am aware has generally not provided simple devices for locating the cylinder axis of an annular portion or of a workpiece on which there is only an imperfect edge such as a merely roughed out piece, and enabling radial measurements from the located axis or point representing the axis. Neither has there been any simple means for measuring bores without removing the boring tools.

SUMMARY OF THE INVENTION

A geometrical measuring device, constructed in accordance with the principles of the present invention, for locating a cylinder axis of an arcuate portion or perimeter, whether an inside or outside diameter surface, on a workpiece has clamping means joining two or more scale bars together adjustably at 90°. This angular relationship enables a machinist to measure simultaneously two radial distances from the arcuate portion in a manner to position the point of intersection of longitudinal axes of the joined scale bars at the cylinder axis of the arcuate portion. For utmost accuracy on a perfectly circular perimeter it is preferably to rotate the joined scale bars so that measurements may be taken at a multiplicity of circumferentially spaced points to ensure that the axis is properly located.

In order to enable readily marking a circular or arcuate line on the workpiece concentric with the axis of the arcuate portion and to enable readily measuring and marking radial distances on an annular portion or workpiece, the clamping means may include means supporting a beam-compass, also referred to as a trammel, for pivotal movement about the located axis.

An assembly of parts of the device and trammel for enabling accurate gauging of inside diameters difficult to reach by conventional inside calipers, is also provided.

BRIEF DESCRIPTION OF THE DRAWINGS

FIG. 1 is a top plan view of a geometrical measuring device embodying features of the present invention and illustrating the use thereof with a beam-trammel instrument for marking arcuate line portions about a cylinder axis of a workpiece;

FIG. 2 is an enlarged fragmental view of the measuring instrument illustrated in FIG. 1;

FIG. 3 is a bottom plan view of the clamping member of the device;

FIG. 4 is a sectional view taken substantially along line IV—IV of FIG. 3;

FIG. 5 is a sectional view taken substantially along line V—V of FIG. 2;

FIG 5A is a side elevational view of a combination of parts or elements of the device and trammel enabling especially inside diameter gauging;

FIG. 6 is a side elevational view of an alternative embodiment of the present invention;

FIG. 7 is an end view of the device shown in FIG. 6;

FIG. 8 is a top plan view of the device shown in FIGS. 6 and 7;

FIG. 9 is a side elevational view of another alternative embodiment of the present invention;

FIG. 10 is a side view of still another alternative embodiment of the present invention; and FIG. 11 is a sectional view taken substantially along line XI—XI of FIG. 10.

DESCRIPTION OF THE ILLUSTRATED EMBODIMENTS

In FIGS. 1 through 5, inclusive, there is shown a geometrical measurement device 15 constructed and arranged to enable readily locating a cylinder axis or center point of an arcuate portion perimeter or circular line formed on a workpiece. The device comprises clamping means 16 joining a pair of graduated scale bars 17 and 18 in a 90° crossed relation. The bars are desirably provided with graduated scales into any convenient measuring system by transversely extending markings as at 19.

The clamping means 16 comprise a rectangular flattened block member preferably elongated in one dimension having a first recess channel or slot 21 formed in one face surface thereof and extending in the long dimension of the member. This recess 21 is characterized by being narrower than the bars 17 and 18 and having a pair of opposed, undercut grooves 22 and 23, spaced apart a distance to slidably guidedly receive the scale bar 17, which may have a standard one-inch width. A second similar recess channel or slit 24 extends at 90° to the first slot 21 and is recessed therebelow, having opposed, undercut grooves 26 and 27 for receiving the scale bar 18 in a crossed arrangement relative to the bar 17. With the scale bars 17 and 18 properly inserted, respectively, into the recesses 21 and 24, longitudinal axes of the scales intersect at a preferred cylinder axis of the clamping means 16.

In order to clampingly secure the bars 17 and 18 relatively adjustably in their respective slots, suitable thumb screws are desirably provided. By having one of the bars, namely the bar 17 mounted in the slot 21 which is longitudinal with the longest and narrowest dimension of the clamping bar 16, it is possible to secure the bars 17 by means of thumb screws 28 threaded into and through respective bores 29 extending inwardly from one edge of the bar and aligned with one of the undercut grooves, herein the groove 23. By having a pair of the thumb screws 28 in securing engagement with the edge of the bar 17, in each portion of the slot 21 bisected by the slot 24, an extremely stable attachment of the bar 17 to the block 16 is attained. Moreover, it is possible, where desirable, to have one or two shorter bar sections each of which may terminate short of the center of the block 16 to provide a clearance, if desired.

Adjusted and adjustable securement of the bar 18, or sectional portions of such bar, is adapted to be effected by means of a respective thumb screw 30 threaded through a respective bore 31 of which there are desirably two, one of which is adjacent to each opposite end of the slot 24.

According to the present invention identical respective attachment means such as adjustable gauging or abutment blocks 37 ae slidably received on the distal end portions of the scale bars 17 and 18 for engagement against an arcuate edge portion as at 38 formed on a workpiece 39, thereby to facilitate properly positioning the clamping block 16 with its axis properly positioned where desired, such as colinear or concentric with a cylinder axis 41 of the arcuate portion. Each of the blocks 37 includes a member having a scale bar slot recess 42 formed in a face surface thereof and characterized by a pair of opposed, undercut grooves 43 and 44 dimensioned to slidably receive one of the scale bars 17 or 18. At least one thumb screw 46 is threaded into the side of the block 37 to engage an edge surface of the scale bar 17 or 18, thereby enabling the block 37 to be fixedly clamped to the scale bar at a desired adjusted position thereon.

In order to provide a centered point contact with the arcuate portion 38, a cylindrical surface 47 is provided on each block 37 desirably formed on a depending pin 48, which has a reduced, threaded end portion 49 received in a threaded aperture 51 formed in a wall portion of the block with the pin axis extending perpendicularly to a face surface of the scale bars 17 and 18, and thus parallel to the crossing axis of the scale bars in clamping block 16. To facilitate reading of radial measurements on the scales of the bars 17 and 18, each of the gauge blocks 37 has a pair of parallel, opposite square end surfaces 52 and 53 extending across and registerable with the scales, and with the cylindrical surface 47 on the pin 48 tangent with the inner end edge 53.

When employing the device 15 in a manner to locate a preferably accurately aligned cylinder axis of the outwardly facing arcuate perimeter or edge portion 38 on the workpiece 39, the pair of scale bars 17 and 18 is clamped into the clamping block 16 in 90° crossed arrangement and the gauge blocks 27 are telescopically fitted over distal or outer end portions of the scale bars. The clamping block 16 may then be positioned with the crossing center of the bars 17 and 18 over the approximate cylinder axis 41 of the arcuate portion 38 and the pins 48 engaged against the arcuate portion. The respective positions of the blocks 37 along the scales of the bars 17 and 18 are then adjusted until equal measurements are obtained between the innermost end edge surfaces 53 and the opposed area of an outer edge surface 54 of the block 16, the known length and width of the block 16 being allowed for in reading the scales. When such equal measurements are obtained, the thumb screws 46 are tightened to lock the blocks 37 in their proper positions. Thereby, two circumferentially spaced points 90° apart on the arcuate edge portion 38 are simultaneously engaged to ensure locating the cylinder axis 41 properly. However, for utmost accuracy proper location of the axis may be checked by rotating the device and taking measurements at another pair of circumferentially spaced points on the edge 38.

When properly positioned, the cylinder axis of the clamping block 16 may be positioned concentrically with the cylinder axis 41 of the arcuate portion 38, although an eccentric axis is feasible by adjustments of the block 16 if desired. In a manner similar to that described hereinabove, a cylinder axis of an internal arcuate perimeter or portion, or of a center point of an arc or circular line may conveniently be located by a machinist or other user of the device 15.

It is also contemplated according to the principles of the present invention to provide means for supporting a beam-compass or trammel instrument 56 for pivotal movement about the located cylinder axis determined by the block 16 and the bars 17 and 18. This instrument 56 comprises a pair of beam heads, sliding sockets or trammel blocks 57 and a graduated scale bar 59 on which the pair of blocks is slidably received. The trammel blocks 57 may be constructed in accordance with the teachings of my copending U.S. Pat. No. 3,562,773. Means for accurately fastening the respective head blocks 57 to the bar 59 comprise a pair of spaced thumb screws 57a threaded into the head ends of these blocks in alignment with the socket portion in which an edge of the bar 59 is engaged. To attain utmost accuracy in the attachment, without any cocking of the block 57 relative to the bar 59 one of the pins 48 is desirably preliminarily engaged with its reduced diameter threaded end portion 49 in a threaded bore 57b which is located in centered relation between the screws 57a and is shorter than the portion 49 so that by driving the end of the threaded portion 49 of the pin 48 against the edge of the bar 59 the blok 57 will be held in positive squared up clamping alignment with the bar edges. Then the retaining thumb screws 57a can be tightened uniformly against the adjacent bar edge to complete the squared up clamping action. Thereupon, the pin 48 can be removed for use on the other of the blocks 57, or returned to the block 37 from which removed, or placed in a spare parts receptacle. If convenient or spares are available, of course, the pins 48 may be left on the blocks 57.

Means for supporting the instrument 56 include a cylindrical bore 60 formed in the clamping block 16 and having its axis disposed concentrically with the crossing axis of the clamping means and thus coaxially with the axis 41 whenever the clamping means is thus positioned as described hereinabove. The bore 60 may be formed in a raised embossment on the block 16. A mating cylindrical surface 61 on one of the trammel blocks 57 is fittingly received in the bore 60, thereby supporting such trammel block 57 for pivotal movement about the located axis 41. The cylindrical surface 61 may be formed on a depending pin 62 threadedly secured to the trammel block 57 and held locked by lock nuts 62a.

In order to scribe or otherwise mark a circular line as at 63 on the workpiece 39, a tapered pin 64 may be threadedly secured to the outer trammel block 57 and locked by lock nuts 64a so that a pointed end 65 of the pin engages the workpiece. Also, the pin 64 may be utilized conveniently to measure radial distances on the workpiece 39 relative to the located axis 41.

Thus, in accordance with the principles of the present invention, the instrument 15 enables a machinist to positively locate a cylinder axis of an arcuate portion or circular line formed on a workpiece and then to use the located axis as a pivot axis for scribing circular lines or for determining radial distances on the workpiece. Since the instrument 15 eliminates any necessity for placing a marking on the workpiece 39 to indicate the position of the located cylinder axis, the instrument 15 may readily be used for marking or determining radial distances on an annular workpiece which has no central portion.

In FIG. 5A is shown a modification according to which the trammel blocks 57 and the bar 59 are adapted to be employed in a device for gauging the surfaces to which access is obstructed in some way such as newly bored holes while the boring tool is still in place and wherein it is desirable to take a check measurement or test caliper. To this end, each of the blocks 57 is adapted to be equipped wih one of the pins or rods 62 or with a separate rod extension 67 threadedly engaged at one end with a distal end of the associated block 57 and locked thereto by lock nuts 68. The rods 67 are desirably coextensive, and are both equipped with a transverse verse threaded bore 69 on the distal portion, in which the threaded end portion 49 of one of the pins 48 is received and the pin tightened against the rod to extend normal thereto. By having the pins 48 extend toward one another, outside dimensions may be gauged, but by having the pins 48 projecting away from one another, as shown, gauging of an inside dimension is facilitated. The instrument as used for gauging an inside dimension, for example, is adjusted by moving the blocks 57 toward one another sufficiently to enable clearance of the ends of the pins 48 into the bore to be measured. Then by having one of the blocks 57 secured fixedly to the bar 59, and with its pin 48 resting on the surface to be measured, the other of the blocks 57 is moved toward the adjacent portion of the surface to be measured until the pin 48 thereof engages the surface whereupon the block 57 is tightened. The distance between the tips of the pins 48 is thereby the dimension between the points on the surface to be measured, such as the diameter. By then removing the device from the workpiece, and applying an outside caliber to the tips of the pins 48, an exact micrometer measurement of the diameter of the bore to be measured is obtained. In this instance, again, use may be made of the same pins 48 as used with the gauge blocks 7, or separate pins of a reserve supply of such pins may be used. Further, by coordinating the known dimensions of the pins 48 with the known dimensions of the blocks 57 and the scale on the bar 59, direct reading of measurements made by and through the pins 48 may be derived by proper adjustment of the blocks 57 relative to one another and along the scale.

In accordance with an alternative embodiment of the present invention, as illustrated in FIGS. 6, 7 and 8, a pair of aligned, adjacently disposed scale bars 71 and 72 is clamped together by another form of the clamping means indicated generally at 73. This comprises an elongated block member having a first slot 74 formed in and along a face thereof and characterized by a pair of opposed, undercut grooves 76 and 77. These grooves 76 and 77 are respectively formed with base wall portions 78 and 79 spaced apart a distance equal to the width of the scale bars 71 and 72. The standard machinist scale used in the United States is generally formed with a width exactly equal to 1 inch, and therefore the spacing between the base wall portions 78 and 79 are desirably spaced apart a clearance distance slightly greater than 1 inch. Thus, the clamping block 73 provides a channel into which an end portion of a scale bar such as 71 or 72 may be slidably received.

The clamping means 73 has four threaded apertures as at 81 formed through an edge thereof and opening into the undercut groove 76. These apertures 81 are longitudinally spaced apart so that two of the apertures overlie an end portion of each of the scale bars 71 and 72 when both bars are inserted an equal distance into the slot channel 74.

Four thumb screws 82, are threaded into the apertures 81 to tightly engage the scale bars 71 and 72, thereby to securely clamp or lock the bars into the clamping block 73. Desirably, the claming block should have a longitudinal length to accept at least one inch of each scale bar 71 and 72. This one-inch overlap and the close fitting relationship between the undercut grooves 76 and 77 provides a clamping means which prevents an elongated scale composed of a series of clamped together scale bars from bending or sagging at juncture points between adjacent aligned bars.

Additionally, in accordance with the principles of the present invention, the clamping means 73 has a second slot 83 formed transversely of the first slot 74 and recessed therebelow into an offset portion 84. The second slot 83 includes undercut grooves 86 and 87 formed normal to the first slot 74 and having base wall portions 88 and 89, respectively, spaced apart a distance to receive a standard one-inch scale bar.

Clamping means are provided by a thumb scrw 91 which threads through an aperture 92 formed laterally through the offset portion 84 to intersect the second slot 83. The thumb screw 91 engages a face of a scale bar, such as bar 93, as shown in FIG. 6, and clamps the bar against side walls 94 and 95, respectively, of the undercut grooves 86 and 87.

With the scale bar 93 properly inserted and clamped into the slot 83 and with the scale bars 71 and 72 properly clamped into the slot 74, the clamping means provides a depth gauge. To utilize the depth gauge formed by the clamping means 73, the scales 71 and 72 are positioned with an edge surface, such as 101 and 102, respectively, thereof engaging a gauging surface surrounding a blind aperture to be measured, and the thumb screw 91 is loosened to permit the scale bar 93 to slide within the slot 83. The bar 93 is inserted into the blind aperture until an end portion thereof securely engages a bottom wall of the blind aperture to be measured. The thumb screw 91 may then be tightened and the scale bars and clamping means removed from the aperture. The depth of the blind aperture will be directly indicated on the scale bar 93 by registration of either edge surface 101 and 102 with the scales on the bars 71 and 72.

The crossed arrangement of scales provided by the clamping means 73 also provides an instrument for readily ascertaining the center point of an arcuate portion or a scribed circle on a workpiece in accordance with the present invention. For this purpose, the scale on the bar 93 is positioned with its midpoint, for example the six-inch marking, aligned with the longitudinal axes of the scales on the bars 71 and 72. The clamping means and the bars are then positioned so that the four outwardly extending arm portions provided by the bars intersect the circular aperture or scribed circle to be measured at an equal distance from the center of a square defined by overlapping portions of the bars. With the bars and the clamping means so arranged, a scribe mark is made of the workpiece precisely adjacent opposed side edges of each arm portion provided by the bars. Due to the 11-inch width of a standard scale bar, the markings provide two sets of aligned pairs of markings precisely 1 inch apart. A pair of lines scribed precisely midway between the two sets of aligned pairs of markings will intersect at the center of the circle. A center of a circle determined by using the clamping block 73 and associated bars is sufficiently accurate for most machining operations on large workpieces.

Further, a cylindrical bore similar to the bore 60 may be formed on the clamping block 73, thereby to provide means supporting a beam-trammel device for pivotal movement about the located axis or center point.

In the form of the invention shown in FIGS. 9 through 11, an extended clamping means is provided to permit joining together a pair of scale bars for forming an extended scale having a length greater than the sum of the pair of scales. In other respects, the clamping means are the same as already described, whereby like parts are identified with like numerals to which a prime has been added.

As illustrated in FIG. 9, the clamping means 73' includes an elongated bar-like block member having a length to permit a 1-inch overlap between opposed end portions of the block member and each of the scale bars 71' and 72' while providing a six-inch spacing between adjacent end portions of the pair of scales. In assembling the device to provide an extended scale utilizing the clamping means 73' the scale bar 71' is slidably inserted into the opposed, undercut grooves 76' and 77' until an outer end edge as at 103 aligns with a marking disposed approximately 1-inch inwardly of an end edge of the member 73'. In a like fashion, the scale bar 72' is slidably inserted into the opposed end portion of the clamping member 73' until an outer end edge 84 thereof aligns with a marking disposed approximately 1-inch inwardly of the other end portion of the member 73'. As thus assembled, the adjacent end portions of the scale bars 71' and 72' are spaced apart a distance equal to exactly 6 inches, although the clamping means 73' may be formed to provide any convenient spacing between the opposed end portions of adjacent scale bars.

It is also contemplated by the present invention that a positive stop may be provided against which the opposed end portion of aligned scale bars 71' and 72' may abut to assure precise spacing therebetween. As illustrated in FIGS. 10 and 11, such a positive stop may be provided by a scale bar 85 slidably inserted into the channel formed by the opposed undercut grooves 76' and 77'. The scale bar 106 is of a length to provide a clear area within the channel of the member 73' at opposite end portions thereof for permitting the scale bars 71' and 72' to be inserted into the block member 73' in an end-to-end relationship therewith.

The scale bar 106 and the block member 73' are each provided with a pair of complementary apertures as at 107 and 108 passing therethrough with the apertures 108 of the block member being threaded and the apertures 107 of the scale bar being countersunk. A pair of flat-head screws 109,109 is inserted through the countersunk apertures 107 of the scale bar 106 and threaded into the aperture 108 formed in the member 73', thereby to secure the scale bar 106 in position within the slot in the member 73'.

In assembling an extended scale utilizing the clamping bar 73' and the scale 106, the scale bars 71' and 72' are slidably inserted into opposite end portions of the channel formed in the clamp 73' until the end portion 103' and 104', respectively, of the scale bars 71' and 72', abut against opposite end portions 111 and 112 of the bar 106. Thereupon, the retaining screws 82' are tightened to lock the bars 71' and 72' in place.

Although minor modifications might be suggested by those versed in the art, it should be understood that I wish to embody within the scope of the patent warranted hereon all such modifications as reasonably and properly come within the scope of my contribution to the art.

I claim as my invention:

1. A generally flat geometrical measurement device comprising:

a clamping block having opposite faces;

one of said faces having a first scale bar slot recessed therein and extending thereacross and opening through opposite edge portions of the block and having respective undercut longitudinal side grooves parallel to the axis of the slot;

a second slot recessed in said block to a greater depth than said first slot and on an axis at 990° to said first slot whereby to define a cylinder axis at the crossing of the slot axes;

said second slot opening through opposite edge portions of the block and having undercut side grooves parallel to the axis of the second slot;

a graduated scale bar in said second slot and having side edges engaged in the undercut grooves of said second slot, with scale markings on the bar exposed at the first slot;

another scale bar in said first slot and having side edges thereof engaged slidably in said undercut grooves of the first slot; and means for adjustably securing said scale bars in said slots;

said first slot having transverse scale markings therein with which an end of the slidably adjustable scale bar in the first slot is adapted to register for effecting a substantial measurement extension of such scale bar relative to the axis of the scale bar in said second slot.

2. A device according to claim 1, wherein said block is substantially elongated in the direction of the axis of said first slot and said first slot extends throughout such length, said scale bar in said first slot being secured by said securing means in one end portion of said first slot, and a second scale bar secured in the opposite end portion of said first slot and extending therefrom.

3. A generally flat geometrical measurement device comprising:

a clamping block having opposite faces;

one of said faces having a first scale bar slot recessed therein and extending thereacross and opening through opposite edge portions of the block and having respective undercut longitudinal side grooves parallel to the axis of the slot;

a second slot recessed in said block to a greater depth than said first slot and on an axis at 90° to said first slot whereby to define a cylinder axis at the crossing of the slot axes;

said second slot opening through opposite edge portions of the block and having undercut side grooves parallel to the axis of the second slot;

a graduated scale bar in said second slot and having side edges engaged in the undercut grooves of said second slot, with scale markings on the bar exposed at the first slot;

another scale bar in said first slot and having side edges thereof engaged slidably in said undercut grooves of the first slot; and means for adjustably securing said scale bars in said slots;

said block having a cylindrical bearing bore located on said cylinder axis and opening from the opposite face of said block for receiving a trammel pivot pin on said axis.

4. A device according to claim 3, wherein said scale bars are relatively longitudinally adjustable in said slots whereby at least one edge of the scale bar in said first slot is visually registrable with a scale marking on the scale bar in said second slot in determining a desired measurement.

5. A device according to claim 3, wherein said means for securing the bars include screws for retaining the scale bar in said second slot, a respective one of such screws extending threadedly into each end portion of said second slot from the opposite face of said block and at respectively opposite sides of and spaced from said bearing bore.

* * * * *

UNITED STATES PATENT OFFICE
CERTIFICATE OF CORRECTION

Patent No. 3,805,397           Dated April 23, 1974

Inventor(s) George Wilamowski

It is certified that error appears in the above-identified patent and that said Letters Patent are hereby corrected as shown below:

Column 1, line 65, delete "may", and after "means" read --for--;
Column 2, line 57, for "slit" read --slot--;
Column 3, line 22, for "According to the present invention identical" read --Identical--, line 23, delete "attachment means such as", line 24, for "ae" read --are--, line 28, after "its" read --cylinder--, and for "properly" read --accurately--, line 32, for "a" read --an upper--, line 44, before "wall" read --solid underside--, line 46, for "a" read --the lower--, line 47, after "in" read --the--;
Column 4, line 46, for "blok" read --block--, line 53, after "convenient" insert a comma;
Column 5, line 34, delete "verse", line 54, for "caliber" read --caliper--, line 58, for "7" read --37--, line 65, after "scale" read --bar 59 --.
Column 8, line 40, for "990°" should read -- 90° --.

Signed and sealed this 1st day of October 1974.

(SEAL)
Attest:

McCOY M. GIBSON JR.          C. MARSHALL DANN
Attesting Officer            Commissioner of Patents